United States Patent Office 3,579,358
Patented May 18, 1971

3,579,358
METHOD OF PREPARING AN EDIBLE TUBULAR COLLAGEN CASING
Albert Courts, Solihull, England, assignor to Lever Brothers Company, New York, N.Y.
No Drawing. Continuation-in-part of application Ser. No. 810,917, Mar. 24, 1969, which is a continuation of application Ser. No. 463,021, June 10, 1965. This application Nov. 26, 1969, Ser. No. 880,436
Int. Cl. A22c *13/00*
U.S. Cl. 99—176         31 Claims

ABSTRACT OF THE DISCLOSURE

Collagen is chemically modified by treatment with a strong alkali in the presence of an alkali metal salt capable of preventing swelling of the collagen. The collagen is then swollen and formed into a dough and is extruded into a precipitating bath to form a tubular casing, particularly a sausage casing.

---

The present application is a continuation-in-part of my co-pending application Ser. No. 810,917, filed Mar. 24, 1969, now abandoned, which is itself a streamlined continuation of my application Ser. No. 463,021, filed June 10, 1965, now abandoned.

This invention relates to edible products, particularly to tubular casings.

Good quality intestine for use as sausage casings (the so-called "natural casing") is often difficult to obtain in the quantities required and is rather expensive. Efforts have been made in the past to produce an artificial or manufactured edible sausage casing having properties similar to those of good quality natural casing, and which could be produced in large quantities relatively cheaply. Several methods of accomplishing this have been suggested but the casings obtained have either been inferior in quality or, if they have been of the desired quality, they have been comparatively expensive.

The present invention provides a method of producing a manufactured sausage casing which comprises treating collagen under strongly alkaline conditions and subsequently extruding the modified collagen to tubular form.

Modification of collagen according to the invention is conveniently brought about by treating the collagen with a saturated or near saturated solution of a salt capable of preventing collagen from swelling, and with a solution of a strong alkali, suitably at a pH of 13 or above. Suitably the salt capable of preventing collagen from swelling is an alkali metal salt, for example sodium sulphate, potassium chloride, sodium chloride, potassium sulphate, lithium sulphate or lithium chloride and it is preferably applied in solution which is more than 90% saturated with respect to the said salt. The strong alkali is one capable of giving a solution of pH 13 or above and is preferably an alkali metal hydroxide, for example sodium hydroxide. Treatment with the alkali should be carried out in the presence of the salt.

The modified collagen obtained can be converted into gelatin more readily than unmodified collagen can, and the extent to which the treatment has modified the collagen may be assessed by the amount of gelatiin produced (as compared with the amount produced from unmodified collagen) when the material is put into an excess of boiling water at a neutral pH and under substantially ion-free conditions. A test to determine the degree of modification of the collagen is given below.

TEST FOR DEGREE OF MODIFICATION OF COLLAGEN

The percent gelatin extractable in 15 minutes at 100° C. from 50 g. of a collagen sample (usually hide) in 100 ml. water is called the "gelatin conversion." The sample is extracted at a pH of 7 to 9, and under substantially ion-free conditions. The sample is washed for at least 24 hours in running water before the gelatin conversion is estimated. The amount of gelatin formed is conveniently determined by measurement of the refractive index of the solution and by comparing the index so obtained with a standard curve of refractive index against gelatin concentration.

Using this test the material used in the preparation of the sausage casing preferably has a gelatin conversion value between about 10% and 22%, and more preferably between about 10% and 17% (unmodified collagen usually shows 5% or less gelatin conversion).

After the initial treatment under strongly alkaline conditions the modified collagen is washed to remove excess alkali and salt. It may be acidified with an acid (not a carboxylic acid) to facilitate complete removal of alkali and salt. Suitably the modified collagen is acidified to a pH between 4 and 5 at this stage and after acidification, washing is continued until the modified collagen has a pH of about 7.

The modified collagen is preferably submitted to comminution at this stage, comminution preferably being continued until the suspension has a smooth, fibrous consistency, having a solids concentration of between 9% and 15%, preferably between 10% and 11%.

The comminuted, modified collagen is then swollen with an acid, preferably a hydroxy carboxylic acid, suitably to a pH between 2.5 and 4.0, preferably to a pH between 2.9 and 3.2. In addition, water may be added to obtain a solids concentration of between 2.5% and 10%, preferably between 6% and 8%.

It is sometimes desirable to alter the drying characteristics of the casing, and to make its moisture content more uniform, a quantity of a suitable plasticiser or humectant may be added to the acid swollen material. For example, glycerol may be added to the acid swollen material to a final concentration of about 1%.

The acidification step is suitably followed by deaeration by thorough mixing of the acid swollen material in a partial vacuum, preferably in air at a pressure below 3 cm. of mercury.

Extrusion of the modified swollen collagen may be preceded by filtration to remove undesirable lumps of material which could block the extrusion apparatus, although the swollen collagen obtained in the process of the invention is usually extrudable without filtration.

Extrusion may be into any suitable precipitating bath, preferably in the temperature range 0°–37° C.

Sodium chloride, in concentrated solution, has been employed very successfully as a precipitating agent for both eucollagen and collagen. (Below about 5% solids it may be found that other chemicals, including such salts as ammonium sulphate, are more suitable as precipitating agents, but use of such substances is not so desirable, since they usually need to be thoroughly washed from the casing, and their presence in a food product is sometimes contrary to food laws. Sodium chloride need not be completely washed from the casing, and contravenes no food laws.) Extrusion into a saturated sodium chloride solution, then, is the preferred way of precipitating the solid material in the suspension.

If desired the precipitating salt may be removed, or at least its concentration in the casing reduced, by washing it prior to drying. Washing may be by spraying the casing with water; preferably the spray water contains about 2.5% by weight of 880 ammonium hydroxide.

A precipitating bath containing salt, particularly sodium chloride, and ammonium hydroxide has also been used. In such a bath the sodium chloride is preferably in saturated solution and the ammonium hydroxide is not greater than N/2, preferably N/10.

Tanning agents may optionally be employed at the precipitating stage or at a subsequent stage to increase the strength of the wet casing. The product may be caused to retain the tubular form by inflating it with a solution of precipitating agent, and/or air, conveniently introduced into the bore of the tube through suitable passages in the extrusion nozzle.

The casing is preferably maintained at a pH not less than 5 during and after the final drying treatment, since it is found that the tendency of the eucollagen it contains to convert to gelatin is increased by the presence of acid. Preferably the pH of the casing is not less than 6. The stage at which the pH of the casing should be adjusted will depend upon the particular processing conditions employed; in general the pH of the casing should never be below 5 when the temperature of the casing is raised above the gelatinisation point of the eucollagen. Thus, the pH is preferably adjusted prior to a temperature elevation, as when the casing is dried by exposure to a high temperature.

After extrusion the casing is usually dried, preferably with warm air. Air is preferably passed through the casing to inflate it during the drying process so that it retains a tubular form.

If desired, after precipitation in salt solution the casing may be partially or substantially completely dried (preferably inflated with air) while it is still saturated with the salt, which is preferably sodium chloride, since it is found that casings so dried are generally stronger than those from which the salt is washed before drying. When such a procedure is followed, after the moisture of the casing has been reduced to about 20% the casing may be washed with water, preferably containing ammonium hydroxide at a low concentration (about N/10). The washed casing is then dried again in warm air to a suitable moisture content.

The invention is illustrated by the following examples.

EXAMPLE 1

5 kg. of limed splits from cattle hide were immersed in 20 litres of water containing 200 p.p.m. of free chlorine for an hour at room temperature. The splits were then transferred to 20 litres of a 10% solution of sodium chloride to which HCl is then added to pH 3.0. When the centre of a cut piece of split was acid to phenolphthalein, the acid washing was complete and the splits were washed in water until the centre of the split showed a neutral reaction.

The splits were then soaked in 20 litres of a saturated solution of sodium sulphate at 20° C. for 24 hours. Sodium hydroxide was then added to make the salt solution molar with respect to sodium hydroxide, that is 4%, and the splits were gently agitated in this bath for a further 24 hours at 20° C.

The "gelatin conversion" of the resulting modified collagen was assessed as follows:

Discs 3.8 cm. in diameter were punched from the splits. A few of the discs were used to determine the solids content by oven drying at 105° C., and 50 g. of the remaining discs were put into 100 ml. of boiling water. The mixture was heated to 100° C. and refluxed for 15 minutes. The resulting gelatin solution was strained from the solids, cooled to 40° C., the pH of the solution was taken to ensure that it was between 7 and 9, and the concentration of gelatin determined by refractive index.

The percent gelatin conversion is $100y$, where $$y = \frac{c(100 + 50(1-x))}{50x\left(1 - \frac{c}{p}\right)}$$

where $x$ is the fractional solids content and $p$ is the density of gelatin and collagen (1.389 g./ml.) and $c$ is the concentration of gelatin in g./ml.

Tested in this way the modified collagen had a gelatin conversion of 14% and therefore was suitable for extrusion to sausage casing.

The treated splits were washed with water, then dilute HCl was added, but the pH was not allowed to fall below 3.0. The splits were again washed in water until the centre of a cut piece was neutral. The splits were then comminuted by passing them through a high speed mincer fitted with a plate having holes about 8 mm. diameter. Water was passed through the machine with the splits to reduce the temperature and to obtain a comminuted mass containing 10% to 11% of solids. The minced modified collagen was then comminuted by three passes through a colloid mill to give a paste having a smooth fibrous consistency.

The modified collagen suspension was then thoroughly mixed in a planetary dough mixer while water and lactic acid were added to obtain a solids concentration of 7% and to reduce the pH to 3.0. The dough so obtained was deaerated by mixing under vacuum in a Z blade mixer for 20 minutes.

The air-free dough, having a viscosity of about 50 poise, was fed to a contra-rotating extrusion nozzle having an annular aperture of 0.5 mm. The indicated extrusion pressure employed for a dough containing 6% collagen was 8 kg./sq. cm., when extruded at 4 metres per minute. The formed casing was extruded upwards into saturated sodium chloride, the tube being inflated with air, saturated sodium chloride was circulated in the interior of the tube.

The inflated casing, while still wet with saturated salt solution, was dried in hot air until the moisture content was below 30%, when it was washed with water to remove the salt, redried in hot air and allowed to equilibrate in an atmosphere at 80% relative humidity for 24 hours.

EXAMPLE 2

30 kg. of fresh limed split trimmings were gently agitated in a vat containing 150 l. of saturated sodium sulphate solution for 18 hours. The temperature of the vat was maintained throughout the process at 20° C. and a small excess of sodium sulphate was added to ensure saturation. Sufficient sodium hydroxide was added to give a concentration of 1 N and this alkali treatment was continued for 24 hours.

The treated hides were washed in running water for 30 minutes and then agitated with dilute hydrochloric acid at pH 4 until the hides were essentially neutral. 10% of sodium chloride calculated on the wet weight of hides was added to the hydrochloric acid solution to prevent swelling of the hides. All traces of acid and salt were then removed by washing in water.

The treated hides were minced twice through a 8 mm. plate, water or ice being added in order to keep the temperature below 25° C. and to give the desired solids content of 10% to 11%. The minced hides were passed three times through a colloid mill to produce a smooth, fibrous paste.

The fibrous paste was mixed vigorously with water and lactic acid to give a viscous mass at pH 3 and containing 7.0% solids. This was deaerated by mixing in a Z blade mixer for 20 minutes at a pressure of 3 cm. mercury.

The deaerated material was extruded through a contra-rotating nozzle into a setting bath consisting of saturated sodium chloride and containing sufficient ammonium hydroxide to be N/10 with respect to the ammonium hydroxide. The casing was dried in a stream of warm air and the salt was removed by spraying with N/10 ammonium hydroxide solution. The washed casing was dried in warm air to a moisture content of 30%.

EXAMPLE 3

One kg. of hide square having a weight range of 5–10 g. were soaked for 24 hours in 4 litres of a saturated solution of potassium chloride. The solution used was then poured off, was made 1 N with potassium hydroxide, and was then poured back onto the hides and this alkali salt treatment was continued for 24 hours at 20° C.

The hides were then neutralised by adding saturated potassium chloride at pH 4 and were left for 24 hours, a small excess of potassium chloride being present to ensure that the solution stayed saturated. The hides were then washed to remove all traces of salt in running water for 24 hours.

The treatment hides were then milled twice through a colloid mill and then twice through a finer colloid mill. The resulting fibrous paste was mixed with water and lactic acid to give a viscous dough having a pH of 3 and a solids content of 4.54%. The viscosity of the dough was measured to be 56.3 poise and the dough was found to be satisfactorily homogenous.

The dough was then deaerated and extruded into a setting bath as described in Example 2. A casing formed continuously and this casing was dried and hardened as described in Example 2.

EXAMPLE 4

One kg. of hide square (weight range of 5–10 g.) was soaked for 24 hours in 4 litres of saturated potassium sulphate solution. The solution was poured off, was made 1 N with potassium hydroxide and was put back on the hides for 24 hours at 20° C. The hides were then neutralised by a saturated salt solution at pH 4 for 24 hours and were then washed to remove all traces of salt in running water for 24 hours.

The hides were then milled four times in colloid mills as described in Example 3.

The milled fibrous paste was made into a dough with water and lactic acid and this dough had a pH of 3.0 and a solids content of 5.15%. The viscosity of the dough was 66.3 poise and the dough was found to be satisfactorily homogenous.

This dough was deaerated, extruded into a setting bath and the casing which was thus formed was dried and hardened, these steps being carried out as described in Example 2.

EXAMPLE 5

Collagen in the form of hide squares was treated with alkali and a salt and then milled using the process of Example 3, except that lithium sulphate was used in place of potassium chloride and lithium hydroxide was used in place of potassium hydroxide. This milled collagen was mixed with water and lactic acid to give a dough having a solids content of 5.3% by weight. The pH of the dough was 3 and its viscosity was 87.5 poise.

This dough was deaerated and extruded into a setting bath and the casing thus formed was dried and hardened, these steps being carried out as described in Example 2.

What is claimed is:

1. A method for the preparation of an edible tubular casing which comprises contacting collagen with a strong alkali capable of giving a solution having a ph of 13 or above in the presence of a salt selected from the group consisting of alkali metal chlorides and sulphates capable of preventing swelling of the collagen, maintaining the alkali in contact with the collagen until the collagen has a gelatin conversion value within the range of about 10% to about 22% to form a modified collagen, comminuting the moidfied collagen and subsequently extruding the comminuted modified collagen in tubular form.

2. The method of claim 1 in which the strong alkali is an alkali metal hydroxide.

3. The method of claim 1 wherein the alkali metal salt is present in the solution at a level sufficient to provide more than 90% saturation with respect to the salt.

4. The method of claim 1 in which the collagen is maintained in contact with the strong alkali until the collagen has a gelatin conversion value within the range of about 10% to about 17%.

5. The method of claim 1 in which the comminuted modified collagen is swollen with a hydroxycarboxylic acid prior to the extrusion step.

6. The method of claim 1 in which the comminuted modified collagen before extrusion is a fluid preparation containing from 2.5% to 10% by weight of total solids.

7. The method of claim 6 in which the solids content of the collagen preparation is from 6% to 8%.

8. The method of claim 1 in which the comminuted modified collagen is extruded into a precipitating bath containing a collagen precipitating salt to form a casing.

9. The method of claim 8 in which the precipitating bath is a saturated aqueous solution of sodium chloride.

10. The method of claim 8 wherein the extruded product is partially or substantially completely dried without removing the collagen precipitating salt therefrom.

11. The method of claim 8 in which the precipitating bath additionally contains a tanning agent.

12. The method of claim 8 in which the bath contains both a collagen precipitating salt and ammonium hydroxide.

13. The method of claim 8 wherein the casing is washed with water containing a small amount of ammonium hydroxide.

14. The method of claim 8 in which the casing is air dried after extrusion.

15. The method of claim 14 in which the casing is maintained at a pH not less than 5 during and after the drying.

16. A method for the preparation of an edible tubular casing which comprises contacting collagen with a strong alkali capable of giving a solution having a pH of 13 or above in the presence of a salt selected from the group consisting of sodium sulphate and sodium chloride, maintaining the alkali in contact with the collagen until the collagen has a gelatin conversion value within the range of about 10% to about 22% to form a modified collagen, comminuting the modified collagen and subsequently extruding the comminuted modified collagen in tubular form.

17. The method of claim 16 in which the alkali is sodium hydroxide.

18. The method of claim 16 wherein the alkali metal salt is present in the solution to a level sufficient to provide more than 90% saturation with respect to the salt.

19. The method of claim 16 in which the collagen is maintained in contact with the strong alkali until the collagen has a gelatin conversion value within the range of about 10% to about 17%.

20. The method of claim 16 in which the comminuted modified collagen is swollen with a hydroxycarboxylic acid prior to the extrusion step.

21. The method of claim 16 in which the comminuted modified collagen before extrusion is a fluid preparation containing from 2.5% to 10% by weight of total solids.

22. The method of claim 21 in which the solids content of the collagen preparation is from 6% to 8%.

23. The method of claim 16 in which the comminuted modified collagen is extruded into a precipitating bath containing a collagen precipitating salt to form a casing.

24. The method of claim 23 in which the precipitating bath is a saturated aqueous solution of sodium chloride.

25. The method of claim 23 wherein the extruded product is partially or substantially completely dried without removing the collagen precipitating salt therefrom.

26. The method of claim 23 in which the precipitating bath additionally contains a tanning agent.

27. The method of claim 23 in which the bath contains both a collagen precipitating salt and ammonium hydroxide.

28. The method of claim 23 wherein the casing is washed with water containing a small amount of ammonium hydroxide.

29. The method of claim 23 in which the casing is air dried after extrusion.

30. The method of claim 29 in which the casing is maintained at a pH not less than 5 during and after the drying.

31. A method for the preparation of an edible tubular casing which comprises contacting collagen with a strong alkali capable of giving a solution having a pH of 13 or above in the presence of sodium sulphate maintaining the alkali in contact with the collagen until the collagen has a gelatin conversion value within the range of about 10% to about 22% to form a modified collagen, comminuting the modified collagen and subsequently extruding the comminuted modified collagen in tubular form.

References Cited

UNITED STATES PATENTS

| | | | |
|---|---|---|---|
| 2,852,812 | 9/1958 | Braun | 99—176X |
| 3,123,653 | 3/1964 | Lieberman | 99—176X |
| 3,194,865 | 7/1965 | Fagan et al. | 99—176X |

HYMAN LORD, Primary Examiner